(12) United States Patent
Slayton et al.

(10) Patent No.: US 7,089,102 B2
(45) Date of Patent: Aug. 8, 2006

(54) COASTING DOWNSHIFT CONTROL FOR AUTOMATIC TRANSMISSIONS

(75) Inventors: Joseph Slayton, Macomb Township, MI (US); Bradley Riedle, Northville, MI (US); Pramod Jain, Farmington Hills, MI (US); Balaram Sankpal, Canton, MI (US); Steven Meisner, Dexter, MI (US); David Bidner, Livonia, MI (US); Armand Giannamore, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 10/661,954

(22) Filed: Sep. 12, 2003

(65) Prior Publication Data

US 2005/0060077 A1 Mar. 17, 2005

(51) Int. Cl.
*G06F 17/00* (2006.01)
*B60W 10/04* (2006.01)

(52) U.S. Cl. .................. 701/51; 701/54; 477/132; 477/77

(58) Field of Classification Search ............... 192/219; 701/51, 54, 53, 55; 477/77, 132, 84
See application file for complete search history.

(56) References Cited

U.S. PATENT DOCUMENTS

| | | | |
|---|---|---|---|
| 5,036,729 A * | 8/1991 | Nitz et al. ............... 477/148 |
| 5,583,766 A | 12/1996 | Birchenough et al. |
| 5,638,271 A | 6/1997 | White et al. |
| 5,941,923 A * | 8/1999 | Fischer et al. ............... 701/53 |
| 6,019,698 A * | 2/2000 | Lawrie et al. ............... 477/5 |
| 6,090,008 A | 7/2000 | Hoshiya et al. |
| 6,132,334 A * | 10/2000 | Tabata et al. ............... 477/149 |
| 6,272,415 B1 | 8/2001 | Tanaka et al. |
| 6,286,379 B1 * | 9/2001 | Yester et al. ............... 74/335 |
| 6,679,806 B1 * | 1/2004 | Ayo et al. ............... 477/54 |
| 6,945,910 B1 * | 9/2005 | Cullen et al. ............... 477/176 |
| 2002/0058570 A1 * | 5/2002 | Steinhauser et al. ....... 477/143 |

* cited by examiner

Primary Examiner—Thomas G. Black
Assistant Examiner—Christine M. Behncke
(74) Attorney, Agent, or Firm—David B. Kelley; MacMillan, Sobanski & Todd

(57) ABSTRACT

An automatic transmission ratio shift control system and method for a powertrain having an engine and multiple-ratio gearing controlled by friction elements actuated by hydraulic pressure, an electronic controller for establishing torque transitions among the friction elements as the gear ratio changes, the engine speed being controlled by an electronic throttle control. The strategy employs an electronic throttle and closed loop engine speed control and uses fuel and air as an energy source to increase engine speed during a power-off downshift. The engine speed is boosted to a level close to the synchronous speed in conjunction with release of the off-going friction element. The on-coming friction element is then applied as the engine speed approaches a desired speed. The engine speed increase is timed to lead an increase in torque converter speed.

7 Claims, 3 Drawing Sheets

COASTING DOWNSHIFT CONTROL FOR AUTOMATIC TRANSMISSIONS

BACKGROUND OF THE INVENTION

1. Field of the Invention

The invention relates to a system and method for controlling a coasting downshift in a vehicle powertrain having an engine and an automatic transmission capable of producing multiple gear ratios.

2. Description of the Prior Art

Coasting or power-off downshifts are those gear ratio changes produced by the transmission automatically in response to a reduction in vehicle speed due to the need for a higher gear ratio. Power-off manual pull-in downshifts are those gear ratio changes initiated manually by the vehicle operator by moving a gear selector lever from a first position corresponding to the current gear to a second position corresponding to the next gear and by relieving force on the accelerator pedal. These actions allow the accelerator pedal to rise and the engine throttle to close, at least partially, in response to movement of the pedal. Such power-off downshifts, both those produced automatically by the transmission control system or those initiated manually by the operator and completed by the control system, are typically not as smooth as non-synchronous coasting downshifts.

Non-synchronous gearshifts are gear ratio changes resulting when a single friction element, a hydraulically actuated clutch or brake, changes its state from engaged to disengaged. Synchronous gear shifts are gear ratio changes resulting when at least two friction elements change state between engaged and disengaged.

During a synchronous downshift, the transmission gear ratio increases, which causes the speed of a torque converter turbine to rise in proportion to the ratio change. Because the engine is coupled to the transmission through the turbine, a power-off downshift causes the engine speed to increase as the turbine speed increases. The energy required to accelerate the engine inertia and friction torque load is supplied by vehicle inertia. This energy exchange causes the output torque supplied to the driven wheels to drop, resulting in a bumpy undesirable shift feel.

There is a need to improve the response of synchronous power-off downshifts and manual pull-in downshifts by controlling the increase in engine speed primarily through electronic throttle control and spark retardation, rather than by the on-coming friction element. Such a strategy would minimize the decrease in output shaft torque because energy required to raise engine speed and turbine speed would be provided by the engine.

A control strategy is required to improve the quality of coasting downshifts to a level equivalent to non-synchronous gear ratio changes. Such a strategy should be applicable both to synchronous and to non-synchronous downshifts.

SUMMARY OF THE INVENTION

The strategy of the present invention employs electronic throttle and closed loop engine speed control in order to use fuel and air as the energy source for increasing engine speed during a power-off downshift. The engine speed is boosted to a level close to the synchronous speed in conjunction with release of an off-going friction element. The on-coming friction element is then applied as the engine speed approaches the desired speed. The engine speed increase is timed to lead the turbine speed increase. Therefore, the turbine does not transmit power to the engine in order to increase the engine speed. The outcome is a smoother power-off downshift.

A closed loop engine controller manipulates spark and air to prevent overshoot of engine speed rise towards the end of the shift. Engine torque feed forward is be used to improve the engine response to an engine speed change command.

The control strategy of this invention improves the quality of coasting downshifts to that of an equivalent non-synchronous gear ratio shift. The strategy is applicable to synchronous-to-synchronous downshift and to non-synchronous-to-synchronous downshifts.

When a gear ratio change occur before the engine reaches the synchronous speed for the oncoming gear ratio, the engine speed is controlled to follow the increase in turbine speed, thereby reducing abrupt inertia effects perceptible on board the vehicle.

In realizing these advantages a method for controlling a powertrain that includes an engine, automatic transmission having an offgoing friction element to be disengaged during a gear ratio change, and a torque converter having a turbine, includes the steps of initiating a gear ratio change from a current gear ratio to a next gear ratio; determining a value representing a desired engine speed until disengagement of the offgoing friction element is detected; determining a rate of increase of desired engine speed during a period following detection of the disengagement of the offgoing friction element; increasing the desired engine speed value at the start of the period by said determined rate of increase during the period; and using the desired engine speed value to control engine speed during the gear ratio change.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
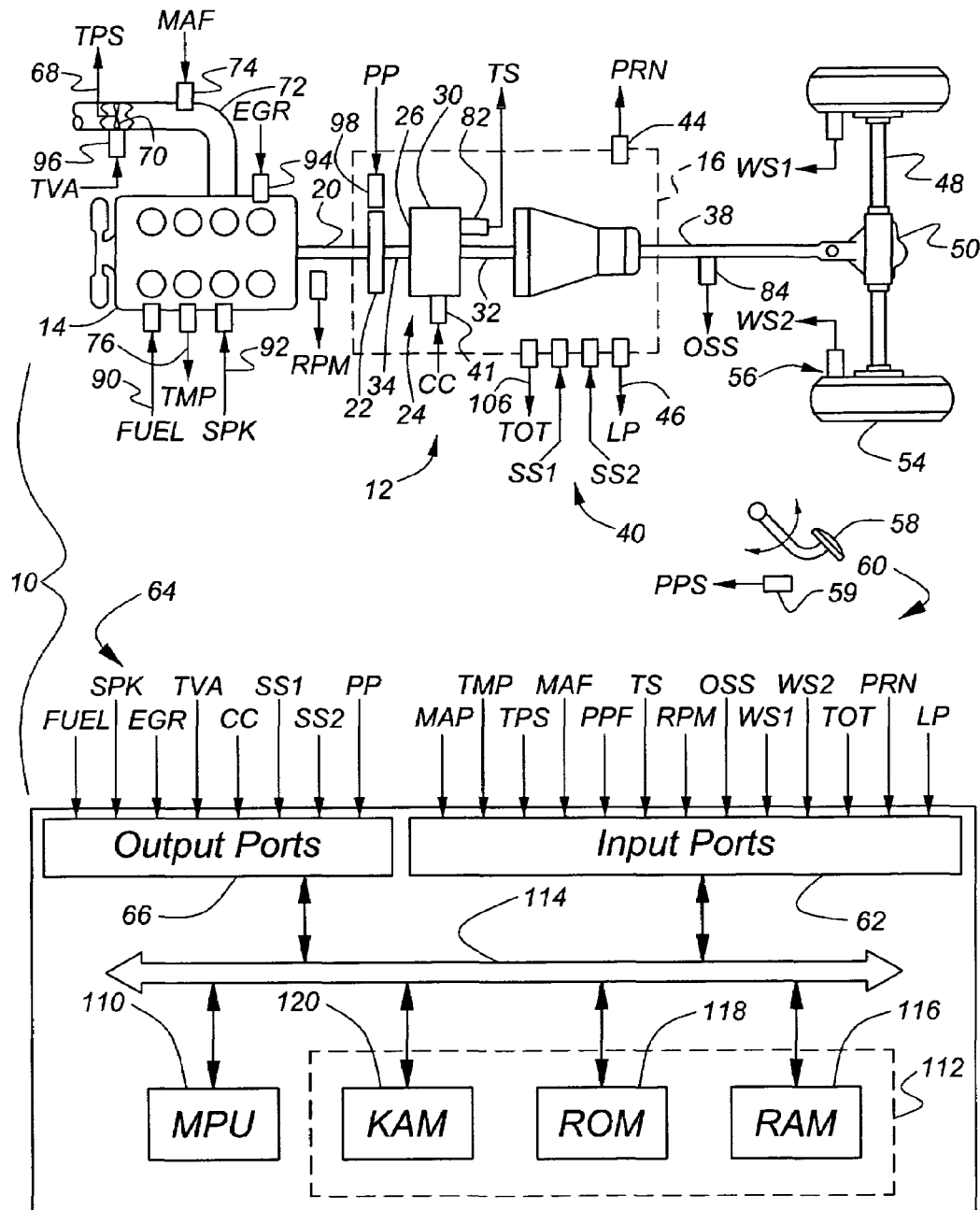
FIG. 1 is a schematic diagram showing a powertrain for an automotive vehicle including a microprocessor for controlling the vehicle transmission and engine.

FIG. 1 is a block diagram illustrating a system 10 for controlling coasting, synchronous downshifts of an automatic transmission according to the present invention. System 10 includes a vehicle power train 12 having an internal combustion engine 14 coupled to an automatic transmission 16. Powertrain 12 may also include a controller 18 in communication with engine 14 and transmission 16 for providing various information and control functions. Engine 14 is connected to transmission 16 via a crankshaft 20, which is connected to transmission pump 22 and/or a torque converter 24. Preferably, torque converter 24 is a hydrodynamic torque converter including a impeller 26, which is selectively hydrokinetically coupled to a turbine 28. Torque converter 24 may also include a frictional converter clutch or bypass clutch 30, which provides a selective frictional coupling between turbine shaft 32 and crankshaft 20.

Automatic transmission 16 produces multiple gear ratios effected by various gears, and associated frictional elements such as clutches, brakes, and couplers. The gearing produces selective torque reduction and torque multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a differential mechanism 50. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 56 to effect control of powertrain 12 in response to commands generated by controller 18.

The sensors preferably include a throttle valve position sensor (TPS) 68, which monitors the position of throttle valve 70, disposed within intake 72. A mass airflow sensor (MAF) 74 provides an indication of the air mass flowing through intake 72. A temperature sensor (TMP) 76 provides an indication of the engine coolant temperature ECT, or alternatively engine oil temperature.

An engine speed sensor (RPM) 80 monitors rotational speed of crankshaft 20. Similarly, a turbine speed sensor 82 monitors the rotational speed of the turbine 28 of torque converter 24. Another rotational speed sensor, the output shaft speed sensor (OSS) 84, provides an indication of the speed of output shaft 38, which may be used to determine the vehicle speed based on the gear ratios of the final drive gearset, differential 50, and the size of wheels 54. Wheel speed sensors (WS1 and WS2) 56 may be used as secondary sources providing an indication of the output shaft speed and vehicle speed.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts, with an increasing number of counts indicating a request for increased power output. A manifold absolute pressure (MAP) sensor, or equivalent, may be used to provide an indication of the current barometric pressure and manifold pressure.

Actuators 64 are used to provide control signals or to effect movement of various devices in powertrain 12. Actuators 64 may include actuators for timing and metering fuel (FUEL) 90, controlling ignition angle or timing (SPK) 92, setting the amount of exhaust gas recirculation (EGR) 94, and adjusting the intake air using throttle valve 70 with an appropriate servomotor or actuator (TVA) 96. As described above, automatic transmission 16 is controlled to produce selectively its various gear ratios by controlling transmission hydraulic line pressure using an appropriate actuator (PP) 42 in combination with shift solenoids (SS1 and SS2) 40, which pressure and vent servos in response to command signals from controller 18. The hydraulic friction clutches and brakes engage and disengage according to the pressurized and vented state of the servos, whereby the appropriate gear ratio is produced. A torque converter clutch locks, unlocks, and produces variable slip across the torque converter clutch 30 in response to a control signal from controller 18 applied to a solenoid (CC) 41, which controls a valve through which the state of the torque converter clutch is changed. Preferably, a temperature sensor 106 produces a signal representing the transmission oil temperature (TOT).

Controller 18 is preferably a microprocessor-based controller, which provides integrated control of engine 14 and transmission 16 of powertrain 12. The present invention may be implemented with a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and non-volatile memory such as random access memory (RAM) 116, read-only memory (ROM) 118, and keep-alive memory (KAM) 120. These functional descriptions of the various types of volatile and nonvolatile storage may be implemented by any of a number of known physical devices including, but not limited to EPROMs, EEPROMs, PROMS, flash memory, and the like. Computer readable media 112 include stored data representing instructions executable by microprocessor 110 to implement the method for controlling hydraulic pressure during shifting according to the present invention.

Figure 2:
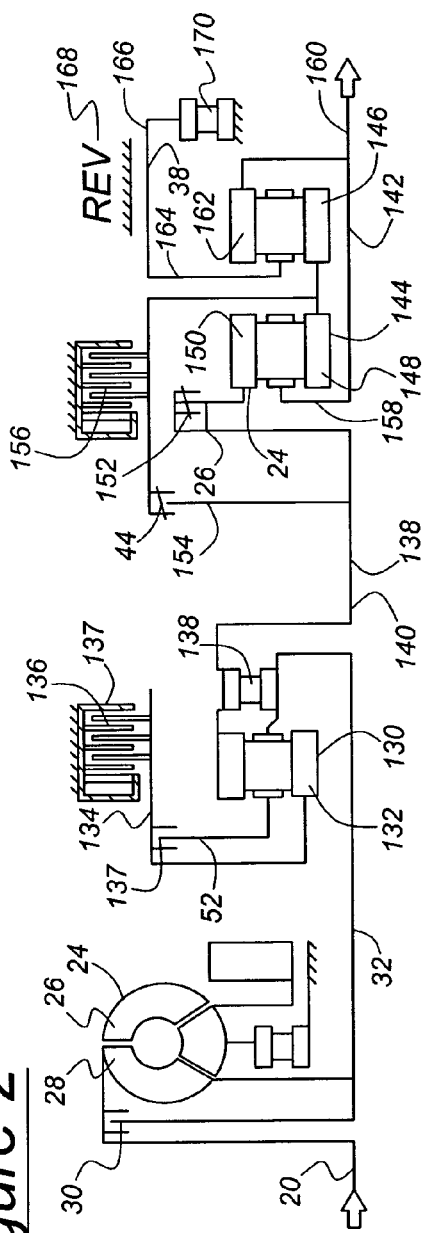
FIG. 2 is a schematic representation of a transmission having a torque converter and multiple-ratio gearing, the gearing elements being controlled by friction clutches and brakes.

FIG. 2 shows in schematic form a multiple-ratio transmission for an automotive vehicle capable of embodying the improved control method and strategy of the invention. The transmission of FIG. 2 is merely one example of a multiple-gear ratio transmission to which the control logic of the present invention can be applied. The invention is not restricted to the specific transmission illustrated in FIG. 2.

The hydrokinetic torque converter 24 has an impeller 26 and a turbine 28 arranged in known fashion in a toroidal fluid flow circuit. The impeller 26 is connected to the crankshaft 10 of the internal combustion engine 14.

Turbine 28 is connected to turbine shaft 32, which transmits torque to the carrier of a simple planetary gear unit 130. Sun gear 132 of the gear unit 130 is connected to overdrive brake drum 134. An overdrive friction disc brake 136 transmits reaction torque to the transmission housing when it is applied, thereby effecting an overdrive condition for the gear unit 130. A coast clutch 137 directly connects the carrier for the gear unit 130 to the sun gear 132, thereby accommodating a reverse torque transfer from the vehicle wheels to the engine through the converter. An overrunning coupling 138 establishes a direct driving connection between the turbine shaft and torque transfer shaft 140.

Shaft 140 serves as a torque input shaft for compound planetary gearing 142, which comprises gear units 144 and 146 with a common sun gear 148. Ring gear 150 of gear unit 14 is connected to shaft 140 through a forward-drive clutch 152. Sun gear 148 is connected to shaft 138 through a high-ratio clutch 154. An intermediate speed ratio brake 156 can brake Sun gear 148 when the clutch 154 is disengaged. The carrier 158 for the gear unit 144 is connected to torque output shaft 160.

Ring gear 162 for the gear unit 146 is connected to shaft 160. The carrier 164 for the gear unit 146 is connected to reverse brake drum 166. Reverse brake band 168 surrounds drum 166 and anchors the carrier 164 during reverse drive. During forward drive in the lowest speed ratio, brake drum 166 is anchored to the transmission housing through overrunning coupling 170.

The transmission operates in the third gear ratio when intermediate brake 156 and forward clutch 152 are engaged. A synchronous downshift to the second gear ratio from third gear results upon disengaging brake 156, the off going friction element, and engaging the overdrive brake 136, the oncoming friction element, while maintaining the forward clutch 152 engaged. Similarly a synchronous manual downshift from third gear to second gear results upon disengaging brake 156 and engaging the overdrive brake 136, while maintaining the forward clutch 152 engaged.

Figure 3:
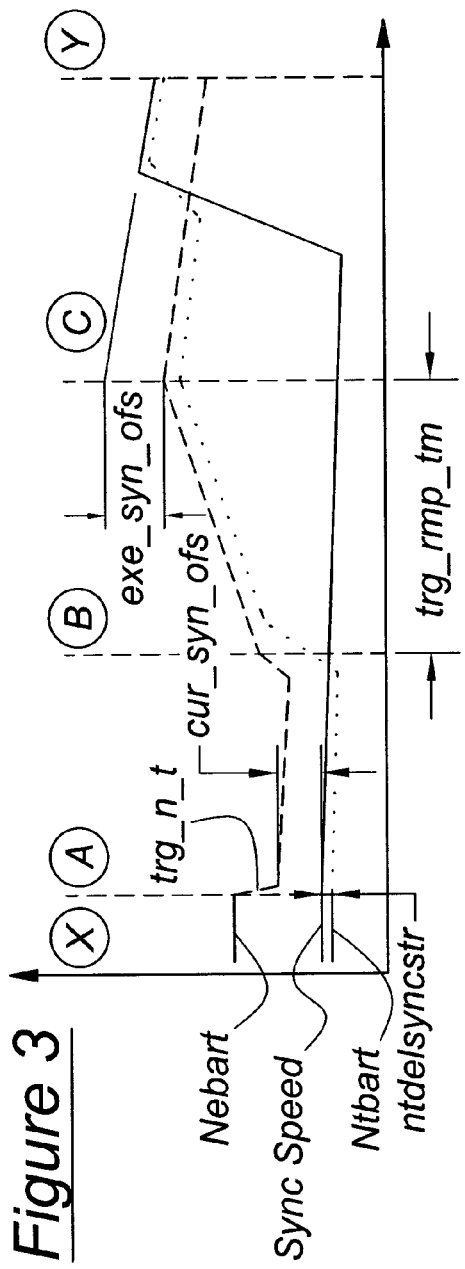
FIG. 3 graphically represents the changes in engine speed, turbine speed, and synchronous speed during a downshift controlled in accordance with this invention, in which the pressure ramp completes.
Figure 4:
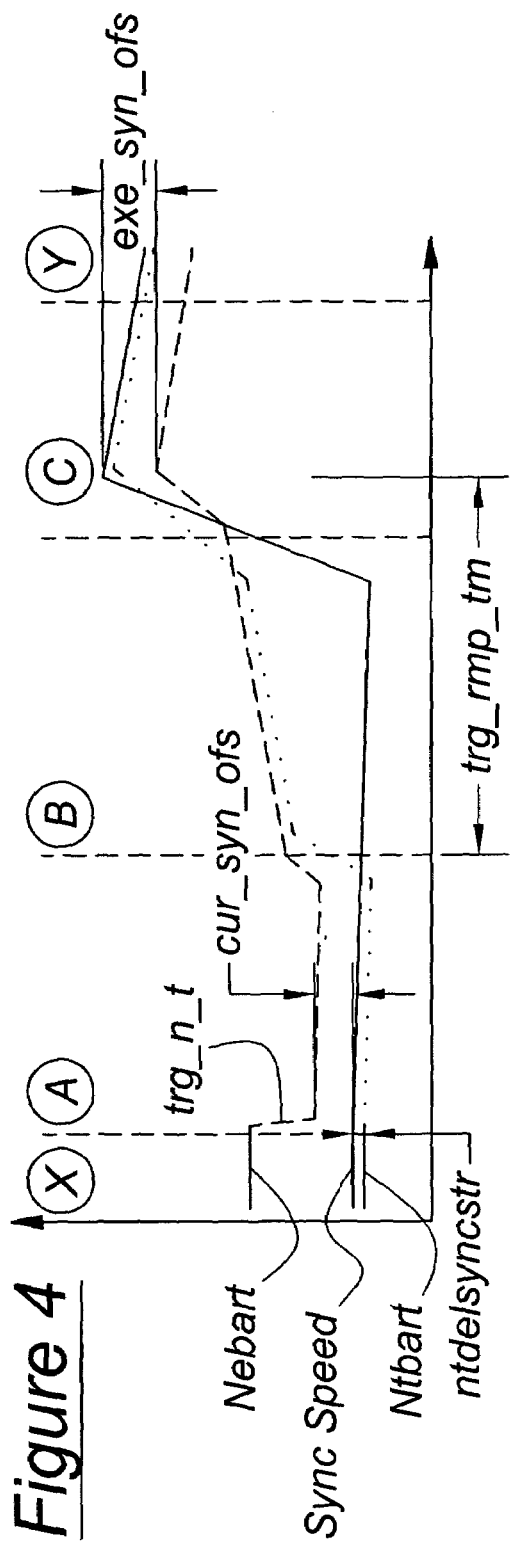
FIG. 4 graphically represents the changes in engine speed, turbine speed, and synchronous speed during a downshift controlled in accordance with this invention, in which the ratio change occurs before the pressure ramp is completed.

FIG. 3 graphically represents the changes in filtered engine speed NEBART, filtered turbine speed NTBART, and synchronous speed, which is the calculated speed of the turbine, i.e., the product of the current output shaft speed OSS and the gear ratio of the transmission. Zone "X" represents a period before a coast condition downshift is initiated by the controller 18 upon issuing a PWM command to the solenoids SS1 and SS2 to change the pressure of the servos associated with the offgoing friction element and the oncoming friction element.

During each control loop of the controller, the exit conditions for the current mode are checked prior to entry into the next mode. If the exit conditions for the current mode are satisfied, then the control logic may proceed during the ratio change to the next mode. Otherwise, the control remains with the current mode. The control logic is executed and the output control signals, transmitted to the solenoids that control the friction elements of the transmission, are sensed in real time.

The digital controller 18 receives input signals from sensors. Control logic is executed and output control signals are sent in real-time to the solenoids that control the friction elements. Engine speed, transmission input speed and output speed are determined from sensors located in the hardware. Other inputs are throttle position, transmission range selector lever position, and transmission oil temperature signals. From the above signals, the output signals are calculated based on the shift control logic.

The following inputs are read from sensors, converted to engineering units, and filtered:
  engine speed (nebart),
  transmission turbine speed (ntbart),
  transmission output shaft speed (nobart),
  transmission oil temperature,
  transmission range selector lever position (PDL), and
  accelerator pedal position (dd_trans).

The following parameters are derived from sensor inputs:
  slip across the torque converter (slip_act)=nebart−ntbart;
  the time derivative of engine speed, turbine speed and output shaft speed;
  the current gear synchronous speed (cur_sync_os)=output shaft speed*current gear ratio;
  next gear synchronous speed (exe_sync_os)=output shaft speed*executing gear ratio;
  vehicle speed (vsbart)=output shaft speed*conversion constant;
  percent shift complete (pcsftcmpt);
  net engine torque (tq_net);
  wheel torque (tq_wheel); and
  transmission ratio (rt_trans).

Closed loop (target-N) control logic consists of four modes, three will execute and one is an alternate: shift start, ramp engine speed, detect coast/brake element apply and turbine follower detect coast/brake element apply. All calibrations involved in the shifts are unique for each particular gear ratio change. Reference to "calibratable or calibrated" means a scalar or function whose value is a predetermined magnitude, which can be changed or calibrated by altering the control algorithm to tune or produce a desired performance characteristic. Calibrated function values are stored in memory, the currently magnitudes of which are determined from a look-up table with reference to another variable or a set of variables, the arguments or indexes of the function.

Each loop, the exit conditions from the current mode to the next mode are checked. If the exit conditions are satisfied, then the control logic for the resulting mode is executed. Otherwise, control remains with the current mode, and the control logic for the current mode is executed. The entry conditions, exit conditions, and the control logic will be described for each mode.

When a synchronous downshift is initiated, the controller enters the Shift Start Mode, which controls engine speed to synchronous speed plus an offset until a neutral interval occurs. Turbine speed is used as positive feedback to produce an increase in engine speed.

First several inquires are made to determine whether to pass control to the Ramp Engine Speed Mode. If the actual transmission turbine speed differs from (current gear synchronous speed+the initial (turbine−synchronous speed)) by a calibrateable amount $$[(ntbart-(cur\_sync\_os-ntdelsyncstr))]>=NEUINT\text{-}DET[TYPE2GEAR[trg\_sftp\_cur]-1]];$$

or an event timer exceeds an element release watchdog time $$[trg\_evnt\_tmr>=trgelrwd\_tm];$$

or the estimated off-going clutch pressure<clutch stroke pressure, then control passes to the Ramp Engine Speed Mode.

During the first execution loop of the Shift Start Mode, the following steps are executed. The event timer (trg_evnt_tmr) is initialize to zero. The element release watchdog time (trgelrwd_tm) is initialize to a calibration constant, which preferably is specific to the current gear shift trgelrwd-tm and is a function fn(gear,tot) stored in electronic memory. The function is indexed in memory by its arguments, the current gear and transmission oil temperature. Engine speed is controlled to the sum of a calibrateable offset plus a predicted current gear synchronous speed plus the difference between turbine speed and the current synchronous output shaft speed (turbine speed−cur_sync_os) at the start of the shift, ntdelsyncstr. The commanded engine speed is expressed as the following relation:

$$[trg\_n\_t=(cur\_synpr\_os+cur\_sync\_ofs+ntdelsyncstr],$$

wherein cur_synpr_os=predicted current gear synchronous speed based on output shaft speed;

cur_sync_ofs=calibrateable offset to synchronous speed; and ntdelsyncsrt=turbine speed−cur_sync_os at the start of the shift.

During execution of subsequent loops of the Shift Start Mode, the following steps are executed. Engine speed is controlled to the calibrateable offset plus the maximum of predicted turbine speed and (current gear synchronous speed+ntdelsyncstr). The increase in turbine speed is used as positive feedback to increase the requested engine speed according to the following relation:

$$[trg\_n\_t=\max\ [(cur\_synpr\_os+netdelsyncstr),\ trg\_tss\_pred)+cur\_syn\_ofs]$$

wherein, trg_ss_pred=predicted turbine speed.

Engine speed can be controlled by manipulating any of various engine parameters including engine output torque, engine airflow, the throttle position of the engine, ignition timing, and engine air-fuel ratio.

An alternative to the Start Shift Mode discussed above, a calculated engine impulse torque approach, is employed. Following the beginning of a synchronous downshift, several inquires are made to determine whether to pass control to the_Ramp Engine Speed Mode. If actual transmission turbine speed differs from calculated input speed by a calibrateable amount $$[ntbart-nobart*rt\_gr\_prev|>minslip];$$

or an impulse timer exceeds the impulse delay time $$[tqea\_imp\_tmr>tqea\_imp\_dl],$$

then control passes to Ramp Engine Speed Mode.

The alternative Start Shift Mode Ramp strategy includes the following steps. Engine below turbine speed. The impulse timer (tqea_imp_tmr) is initialize to zero. Impulse time (tqea_imp_tm), and impulse delay (tqea_imp_dl) are initialize to shift specific calibration constants, tqea_imp_dl=FN(gr_cm, vsbart). Pressure to the off-going clutch is reduced during every loop along a ramp until it reaches a magnitude below the boost pressure value. Estimate off-going clutch pressure assuming a first order system. Finally the on-coming clutch pressure is set to stroke pressure, the relatively high pressure of short duration used to quickly take up clearances among the friction discs, spacer plates, backing plate and piston of the on-coming clutch and its hydraulic servo, without engaging the clutch.

The control strategy of the Ramp Engine Speed Mode is to increase (or ramp) the engine speed request from its current magnitude to the next gear synchronous speed plus an offset, which is a calibrateable scalar or constant.

Exit from the Ramp Engine Speed Mode to the Detect Coast/Brake Element Apply Mode if the commanded engine speed increase ramp is completed before the ratio change to the next gear begins, or if the current value of the engine speed request plus the ramp step is greater than the predicted next gear synchronous speed plus an offset.

$$(trg\_n\_t+\text{ramp step})>=(exe\_sync\_os+exe\_sync\_ofs)]$$

Exit from the Ramp Engine Speed Mode to Turbine Follower Detect Coast/Brake Element Apply Mode if the ratio change has begun before the ramp has been completed, or if the turbine speed increases above engine speed, which generates a negative slip_act value. Slip is the difference between speed of the turbine shaft relative to speed of the engine shaft.

Slip_act must be less than a calibrateable value, [slip_act <=FN(gear)].

During the first execution loop of the Ramp Engine Speed Mode, the following steps are executed. Set up the engine speed ramp by calculating the ramp start value from the following relation:

$$[\text{ramp start value}=\max((cur\_synpr\_os+netdelsyncstr),\ trg\_tss\_pred)+cur\_syn\_ofs],$$

wherein cur_synpr_os=the predicted current gear synchronous speed based on output shaft speed.

ntdelsyncsrt=the turbine speed−cur_sync_os at the start of the shift cur_sync_os=the current gear synchronous speed based on output shaft speed.

trtss_pred=is the predicted turbine speed.

cur_sync_ofs=the offset to current gear synchronous speed.

Calculate the final target value from [exe_sync_os+exe_sync_ofs]

wherein exe_synpr_os=executing (next) gear synchronous speed based on output shaft speed.

exe_sync_ofs=offset to executing (next) gear synchronous speed.

Then look-up the gear-dependent calibrateable ramp time. Calculate the ramp rate from (final target value−start value)/ramp time, and calculate the engine speed request value from $$[trg\_n\_t=(\text{ramp start value}+\text{ramp step})]$$

During the execution of subsequent loops of the Ramp Engine Speed Mode, the following steps are executed. Since it is possible for the output shaft speed to change during the ramp, recalculate the final target engine speed request value from the following relationship:

$$[trg\_rmp\_tarv=exe\_synpr\_os+exe\_syn\_ofs]$$

wherein exe_synpr_os=executing gear (final gear) predicted synchronous speed.

exe_syn_ofs=executing gear (final gear) synchronous speed offset.

Two likely events will occur: Either the ramp value will exceed the predicted target value during execution of the Ramp Engine Speed Mode, or the gear ratio change will occur and be completed while the engine speed is increasing and before the ramp is completed.

An alternative to the Ramp Engine Speed Mode discussed above, a calculated engine impulse torque approach, can be employed. Several inquires are made first to determine whether to pass control to the_Shift End Mode. Exit from the Ramp Engine Speed Mode to Shift End Mode if engine speed is within a calibrateable target ratio reduction (tqeatargrd) limit, where tqeatargrd is the engine speed target ratio reduction $$[nebart>(tqeatargrd*engine\_speed\_des)],$$

or transmission ratio approaches next gear $$[pcsftcmpt>\text{target percent shift complete }(pcsftpnse),$$

wherein pcsftcmpt is the percent shift complete, and pcsftpnse is the target ratio in percentage to indicate completion of shift;

or Turbine speed>engine speed & rising faster than engine speed & transmission ratio approaches next gear $$[ntbart>nebart \ \& \ ndtbart>ndebart \ \& \\ pcsftcmpt>pcsftpnesc]$$

wherein ntbart is the transmission turbine speed, RPM ndtbart=time integral of turbine speed, RPM-s ndebart=time derivative of engine speed, RPM/s pcsftcmpt=percent shift complete, and pcsftpnesc=target ratio in percentage to exit engine speed control mode During the first execution loop of the alternative Ramp Engine Speed Mode strategy, the following steps are executed. Capture the current engine speed engine_speed_strt), which is the engine speed at the start of the torque impulse.

During the execution of subsequent loops of the alternative Ramp Engine Speed Mode strategy, the following steps are executed. Calculate the desired engine speed. Since the vehicle speed is most likely not constant due to the coasting condition with possible wheel braking, closed loop control is performed on desired engine speed. This offers better performance against overshooting the desired engine speed. Calculate impulse time remaining (imp_tmr) from the following relation:

$$imp\_tmr=tqea\_imp\_tm+tqea\_imp\_dl-tqea\_imp\_tmr,$$

wherein imp_tmr=impulse time remaining tqea_imp_tm=total impulse time tqea_imp_dl=impulse delay from start of shift tqea_imp_tmr=elapsed impulse time Then calculate the predicted output shaft speed from the following:

$$nopred=nobart+ndobart*imp\_tmr,$$

wherein nopred=predicted output shaft speed at end of impulse (RPM)

nobart=transmission output shaft speed (RPM)

ndobart=time derivative of output shaft speed (RPM/s)

imp_tmr=impulse time remaining), and the maximum value for ndobart is zero.

Calculate desired engine speed from the relation:

$$Engine\_speed\_des=nopred*rt\_gr\_nxt,$$

wherein nopred=predicted output shaft speed at end of impulse (RPM), and rt_gr_nxt=next gear ratio.

Determine impulse torque by applying the conservation of momentum equation to the engine boundary using average friction terms throughout the integral. The boundary consists of engine net impulse torque (tqea_imp_add), engine friction torque (fric_tq), and accessory load torque (accld_tq) required to achieve the desired change in engine speed (mntm_tq).

Calculate engine friction torque as follows:

$$fric\_tq=(fnfric\_tq(engine\_speed\_strt, \ ect)+fnfric\_tq \\ (engine\_speed\_des, \ ect)/2,$$

wherein fnfric_tq=engine friction torque function engine_speed_strt=engine speed at the start of the torque impulse ect=engine coolant temperature, and engine_speed_des=desired engine speed at the end of the torque impulse.

Calculate average accessory load torque as follows:

$$accld\_tq=(fnaccld\_tq(engine\_speed\_strt)+fnaccld\_\\ tq(engine\_speed\_des)/2$$

Calculate delta engine speed momentum torque as follows:

$$mntm\_tq=i\_eng*(engine\_speed\_des-engine\_speed\_\\ strt)/tqea\_imp\_tm,$$

wherein mntm_tq=momentum torque to change engine speed i_eng=engine rotating inertia (includes inertia attached to crank shaft), and tqea_imp_tm=total impulse time.

Calculate impulse torque profile to add to base torque:

$$tqea\_imp\_add=(fric\_tq+accld\_tq+mntm\_tq)*fn-\\ impkp(rt\_targrd),$$

wherein tqea_imp_add=impulse torque to add to base torque, and rt_targrd=(current engine speed−engine_speed_strt)/(engine_speed_des−engine_speed_strt)

This impulse torque is added every loop to the coasting level of engine torque.

The control strategy of the Detect Coast/Brake Element Apply Mode is to control engine speed to the synchronous speed corresponding to the next gear ratio and look for the gear ratio change to be completed.

Exit from the Detect Coast/Brake Element Apply Mode to a not shifting mode when the turbine speed is within a calibrateable threshold of the new gear synchronous speed over a calibrateable interval of time, i.e., when the ratio change complete timer (trgrtcmp_tmr)>FN(gear)

During the first execution loop of the Detect Coast/Brake Element Apply Mode, the following steps are executed: initialize the ratio change complete timer to zero; calculate engine speed request value; and look for the current gear ratio change to be completed.

Calculate engine speed request value from the following:

$$[trg\_n\_t=exe\_sync\_os+exe\_sync\_ofs],$$

wherein exe_sync_os=the executing or next gear synchronous speed based on output shaft speed, exe_sync_ofs=an offset to the executing gear synchronous speed.

Clear the ratio change complete timer if the turbine speed is not within a calibrateable threshold of the new gear synchronous speed. Preferably, when the turbine speed is not within the calibrateable threshold of the new gear synchronous speed during consecutive execution loops of the Detect Coast/Brake Element Apply Mode, then the ratio change complete timer is cleared. Otherwise, the timer remains uncleared. These relations are expressed [abs(ntbart−exe_sync_os)>FN(gear), wherein ntbart=transmission turbine speed (RPM).

During the execution of subsequent loops of the Detect Coast/Brake Element Apply Mode, the following steps are executed: increment the ratio change complete timer; calculate engine speed request value; and look for ratio change to be completed.

The control strategy of the Turbine Follower Detect Coast/Brake Element Apply Mode is to control engine speed so that it follows the turbine speed increase and look for the ratio change to be completed.

Exit from the Turbine Follower Detect Coast/Brake Element Apply Mode to a not shifting mode when turbine speed is within a calibrateable threshold of the new gear synchronous speed over a calibrateable interval. Preferably, when the turbine speed is within the calibrateable threshold of the new gear synchronous speed during five consecutive execution loops of the Turbine Follower Detect Coast/Brake Element Apply Mode, then the ratio change complete timer is cleared. Otherwise, the timer remains uncleared. A ratio change complete timer (trgrtcmptmr) is continually monitored to determine when the following relation is satisfied: (trgrtcmp_tmr)>FN(gear).

During the first execution loop of the Turbine Follower Detect Coast/Brake Element Apply Mode, the following steps are executed: initialize the ratio change complete timer to zero; calculate engine speed request value; and look for the ratio change to be completed.

Calculate engine speed request value to lag the predicted turbine speed increase by a calibrateable amount. To prevent overshooting the next gear synchronous speed, set the engine speed request value to the minimum of the predicted turbine speed increase plus an offset, and the next gear synchronous speed plus an offset.

$$Trg\_n\_t = \min[(trg\_tss\_pred + trg\_tss\_pred\_ofs), (exe\_sync\_os + exe\_sync\_ofs)],$$

wherein
trg_tss_pred=predicted turbine speed
trg_tss_pred_ofs=offset to predicted turbine speed FN[gear]
exe_sync_os=executing (next) gear synchronous speed based on output shaft speed, and
exe_sync_ofs=offset to executing (next) gear synchronous speed.

Clear the ratio change complete timer if the turbine speed is not within a calibrateable threshold of the new gear synchronous speed [abs(ntbart−exe_sync_os)>FN(gear)].

During the execution of subsequent loops of the Turbine Follower Detect Coast/Brake Element Apply Mode, the following steps are executed: increment the ratio change complete timer; calculate engine speed request value and look for ratio change to complete; and execute the same algorithm as for the first loop of the Turbine Follower Detect Coast/Brake Element Apply Mode.

Exit to not shifting mode when the transmission gear ratio has reached the target ratio, i.e., [pcsftcmpt>pcsftpnse], wherein
pcsftcmpt=percent shift complete
pcsftpnse=target ratio in percentage to indicate completion of shift, and minimum time in the shift end mode is expired, or the maximum allowed time in the shift end mode is expired.

Control Strategy is to modulate engine torque by retarding spark.

Percent torque reduction=tr_lim_mod=fn(nebart), wherein tr_lim_mod=percent engine torque reduction. Retard the spark for a time=fn(nebart). Ramp impulse torque down to zero over time=fn(nebart). Ramp friction element pressure until it reaches line pressure. The ramp could be a parabolic ramp.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling a powertrain that includes an engine, automatic transmission having an offgoing friction element to be disengaged during a gear ratio change, and a torque converter having a turbine, the method comprising the steps of:
   initiating a gear ratio change from a current gear ratio to a next gear ratio;
   determining a value representing a desired engine speed until disengagement of the offgoing friction element is detected;
   determining a predicted current gear synchronous speed, and an offset to the current gear synchronous speed;
   setting the desired engine speed equal to the predicted current gear synchronous speed plus an offset to the current gear synchronous speed;
   using the desired engine speed value to control engine speed until disengagement of the offgoing friction element is detected during the gear ratio change;
   determining a rate of increase of desired engine speed during a period following detection of the disengagement of the offgoing friction element;
   increasing the desired engine speed value at the start of the period by said determined rate of increase of desired engine speed during the period; and
   using the desired engine speed value to control engine speed during the gear ratio change.

2. The method of claim 1, wherein the step of determining a value representing a desired engine speed until disengagement of the offgoing friction element is detected, further comprises the steps of:
   determining a predicted current gear synchronous speed, and an offset to the current gear synchronous speed;
   determining a predicted target turbine speed;
   setting the desired engine speed equal to the sum of the offset to the current gear synchronous speed plus the greater of the predicted target turbine speed and the predicted current gear synchronous speed; and
   further comprising using the desired engine speed value to control engine speed until disengagement of the offgoing friction element is detected during the gear ratio change.

3. The method of claim 1, wherein the step of determining a rate of increase of desired engine speed during the period following detection of the disengagement of the offgoing friction element, further comprises the steps of:
   determining a target desired engine speed during the period;
   determining a desired engine speed at the beginning of the period;
   determining the length of the period that corresponds to the current gear ratio;
   calculating the time rate of change of desired engine speed during the period by dividing the difference between the target desired engine speed and the desired engine speed at the beginning of the period by the length of the period.

4. The method of claim 1 wherein the step of determining a rate of increase of desired engine speed during the period following detection of the disengagement of the offgoing friction element, further comprises the steps of:

determining a predicted current gear synchronous speed, and an offset to the current gear synchronous speed;

determining a predicted target turbine speed;

determining the length of the period that corresponds to the current gear ratio; and calculating the time rate of change of desired engine speed during the period by dividing the difference between the sum of the offset to the current gear synchronous speed plus the greater of the predicted target turbine speed and the predicted current gear synchronous speed by the length of the period.

5. The method of claim 1 wherein the step of increasing the desired engine speed value at the start of said period by said determined rate of increase during the period, further comprises the step of:

repetitively increasing at frequent intervals the desired engine speed value a last interval by the time rate of change of desired engine speed.

6. The method of claim 1, further comprising the steps of:

determining a next gear synchronous speed, and a threshold of the next gear synchronous speed;

determining a target engine speed based at least on at least in part the next gear synchronous speed; and discontinuing use of the desired engine speed value to control engine speed during the gear ratio change when the turbine speed is within the threshold of the next gear synchronous speed for a predetermined period.

7. The method of claim 1, further comprising the steps of:

determining a predicted turbine speed;

determining a next gear synchronous speed, and a threshold of the next gear synchronous speed; and generating a command to produce an engine speed that is the lesser of the predicted turbine speed and the next gear synchronous speed; and discontinuing use of the desired engine speed value to control engine speed during the gear ratio change when the turbine speed is within the threshold of the next gear synchronous speed for a predetermined period.

* * * * *